United States Patent
Parker

(10) Patent No.: US 10,824,749 B2
(45) Date of Patent: Nov. 3, 2020

(54) AUTOMATIC GRAPH-BASED DETECTION OF UNLIKELY FILE POSSESSION

(71) Applicant: Code 42 Software, Inc., Minneapolis, MN (US)

(72) Inventor: Matthew Mills Parker, Denver, CO (US)

(73) Assignee: Code 42 Software, Inc., Minneapolis, MN (US)

( * ) Notice: Subject to any disclaimer, the term of this patent is extended or adjusted under 35 U.S.C. 154(b) by 216 days.

(21) Appl. No.: 16/147,086

(22) Filed: Sep. 28, 2018

(65) Prior Publication Data

US 2020/0104518 A1    Apr. 2, 2020

(51) Int. Cl.
| | |
|---|---|
| *G06F 21/62* | (2013.01) |
| *H04L 29/06* | (2006.01) |
| *G06F 11/32* | (2006.01) |
| *G06F 16/901* | (2019.01) |

(52) U.S. Cl.
CPC ........ *G06F 21/6209* (2013.01); *G06F 11/327* (2013.01); *G06F 16/9024* (2019.01); *H04L 63/102* (2013.01)

(58) Field of Classification Search
CPC ............. G06F 21/6209; G06F 16/9024; G06F 11/327; H04L 63/102
USPC ....................................................... 713/165
See application file for complete search history.

(56) References Cited

U.S. PATENT DOCUMENTS

| | | | | |
|---|---|---|---|---|
| 8,185,558 | B1* | 5/2012 | Narayanan | G06F 16/9024 707/798 |
| 9,185,119 | B1* | 11/2015 | Tamersoy | H04L 63/14 |
| 9,323,924 | B1* | 4/2016 | Roundy | G06F 21/577 |
| 9,842,166 | B1* | 12/2017 | Leviathan | G06F 16/9024 |
| 9,886,521 | B2* | 2/2018 | Wu | G06F 16/9024 |
| 2004/0133539 | A1* | 7/2004 | Talagala | G06F 16/9024 |
| 2009/0313267 | A1* | 12/2009 | Girgensohn | G06F 16/44 |
| 2010/0014432 | A1* | 1/2010 | Durfee | H04L 63/1441 370/242 |
| 2011/0213801 | A1* | 9/2011 | He | G06F 16/9024 707/770 |
| 2012/0079596 | A1* | 3/2012 | Thomas | G06F 21/566 726/24 |
| 2012/0096043 | A1* | 4/2012 | Stevens, Jr. | G06F 16/9024 707/798 |

(Continued)

*Primary Examiner* — Shahriar Zarrineh
(74) *Attorney, Agent, or Firm* — Schwegman Lundberg & Woessner, P.A.

(57) ABSTRACT

Systems and techniques for an automatic graph-based detection of unlikely file possession are described herein. In an example, a system for detecting unauthorized file possession is adapted to generate a networked computing environment graph for files and the devices which store the files. The detection system may be further adapted to identify a file in question and a device in question that is in possession of the file in question. The detection system may be further adapted to generate a set of connection paths from the device in question to the file in question based upon the edges of the graph. The detection system may be further adapted to determine the device in question should not have possession of the file in question based on a set of metrics derived from the connection paths. The detection system may be further adapted to generate an alert based on the determination.

17 Claims, 9 Drawing Sheets

(56) References Cited

U.S. PATENT DOCUMENTS

| | | | | |
|---|---|---|---|---|
| 2012/0266245 A1* | 10/2012 | McDougal | G06F 21/567 | 726/24 |
| 2012/0323829 A1* | 12/2012 | Stokes | G06K 9/6224 | 706/12 |
| 2013/0204886 A1* | 8/2013 | Faith | G06Q 30/06 | 707/756 |
| 2013/0235040 A1* | 9/2013 | Jackson, Jr. | G06F 16/9024 | 345/440 |
| 2014/0009472 A1* | 1/2014 | Ajitomi | G06T 11/206 | 345/440 |
| 2014/0101434 A1* | 4/2014 | Senthurpandi | G06F 21/32 | 713/150 |
| 2015/0026103 A1* | 1/2015 | Goldschmidt | G06N 20/00 | 706/12 |
| 2015/0033106 A1* | 1/2015 | Stetson | G06F 16/248 | 715/215 |
| 2015/0120721 A1* | 4/2015 | Kim | G06Q 30/02 | 707/728 |
| 2015/0302300 A1* | 10/2015 | Fletcher | G06N 5/04 | 706/11 |
| 2016/0156631 A1* | 6/2016 | Viswanathan | H04L 67/1097 | 726/3 |
| 2016/0335360 A1* | 11/2016 | Falcone | G06F 16/2379 | |
| 2017/0076206 A1* | 3/2017 | Lastras-Montano | G06F 16/9024 | |
| 2017/0078322 A1* | 3/2017 | Seiver | H04L 63/1433 | |
| 2017/0221240 A1* | 8/2017 | Stetson | G06F 16/9024 | |
| 2017/0308621 A1* | 10/2017 | Wu | G06F 16/9024 | |
| 2017/0344586 A1* | 11/2017 | Constantinescu | G06F 16/1727 | |
| 2018/0046801 A1* | 2/2018 | Falk | G06F 21/56 | |
| 2018/0130019 A1* | 5/2018 | Kolb | G06Q 10/10 | |
| 2018/0137424 A1* | 5/2018 | Gabaldon Royval | G06N 5/022 | |
| 2018/0150569 A1* | 5/2018 | Wechsler | G06F 16/9024 | |
| 2018/0191860 A1* | 7/2018 | Ghafourifar | H04L 67/327 | |
| 2018/0219888 A1* | 8/2018 | Apostolopoulos | H04L 63/1425 | |
| 2018/0367557 A1* | 12/2018 | Brown | G06F 16/90335 | |
| 2019/0042879 A1* | 2/2019 | Munoz | G06F 16/9024 | |
| 2019/0089720 A1* | 3/2019 | Aditham | H04L 9/3239 | |
| 2019/0130613 A1* | 5/2019 | Bhatt | G06F 16/9024 | |
| 2019/0205480 A1* | 7/2019 | Zhang | G06F 16/9024 | |
| 2019/0266341 A1* | 8/2019 | Ravizza | G06F 21/6218 | |
| 2019/0317728 A1* | 10/2019 | Chen | G06F 16/2379 | |
| 2019/0362240 A1* | 11/2019 | Kimura | G06F 16/9024 | |
| 2020/0104426 A1* | 4/2020 | Wu | G06F 16/9024 | |

* cited by examiner

AUTOMATIC GRAPH-BASED DETECTION OF UNLIKELY FILE POSSESSION

TECHNICAL FIELD

Embodiments described herein generally relate to determining a computing device or a user of a computing device in a networked computing environment has unauthorized access to a file.

BACKGROUND

Many organizations, such as corporations and government agencies, possess large quantities of sensitive data in their networked computing systems and databases. Sensitive data may include customers' private data, internal strategy documents, payroll records, human resources information, trade secrets, and other intellectual property. Protecting these files from unauthorized proliferation, from both unintentional and malicious actions, is a crucial responsibility. However, for the functionality of the users who do have authorized access to the data, protection needs to be balanced with providing for fast, flexible, and safe collaboration.

Many organizations may rely on top-down policies for who should have access to which kinds of data. This type of top-down policy may depend on credentials of the users to control a user's access to files. This may be challenging and laborious to specify appropriate credential controls for every file at an organization, which may result in individuals or groups within an organization circumventing the controls to achieve smooth operations. Credentials may be stolen or borrowed by users.

In some organizations, software may be used that scans the contents of files to identify files with sensitive data, such as social security numbers, credit cards numbers, or payroll information. This type of measure requires granting access to possible external software for all file contents, which may only detect a handful of predetermined and clearly-defined patterns.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
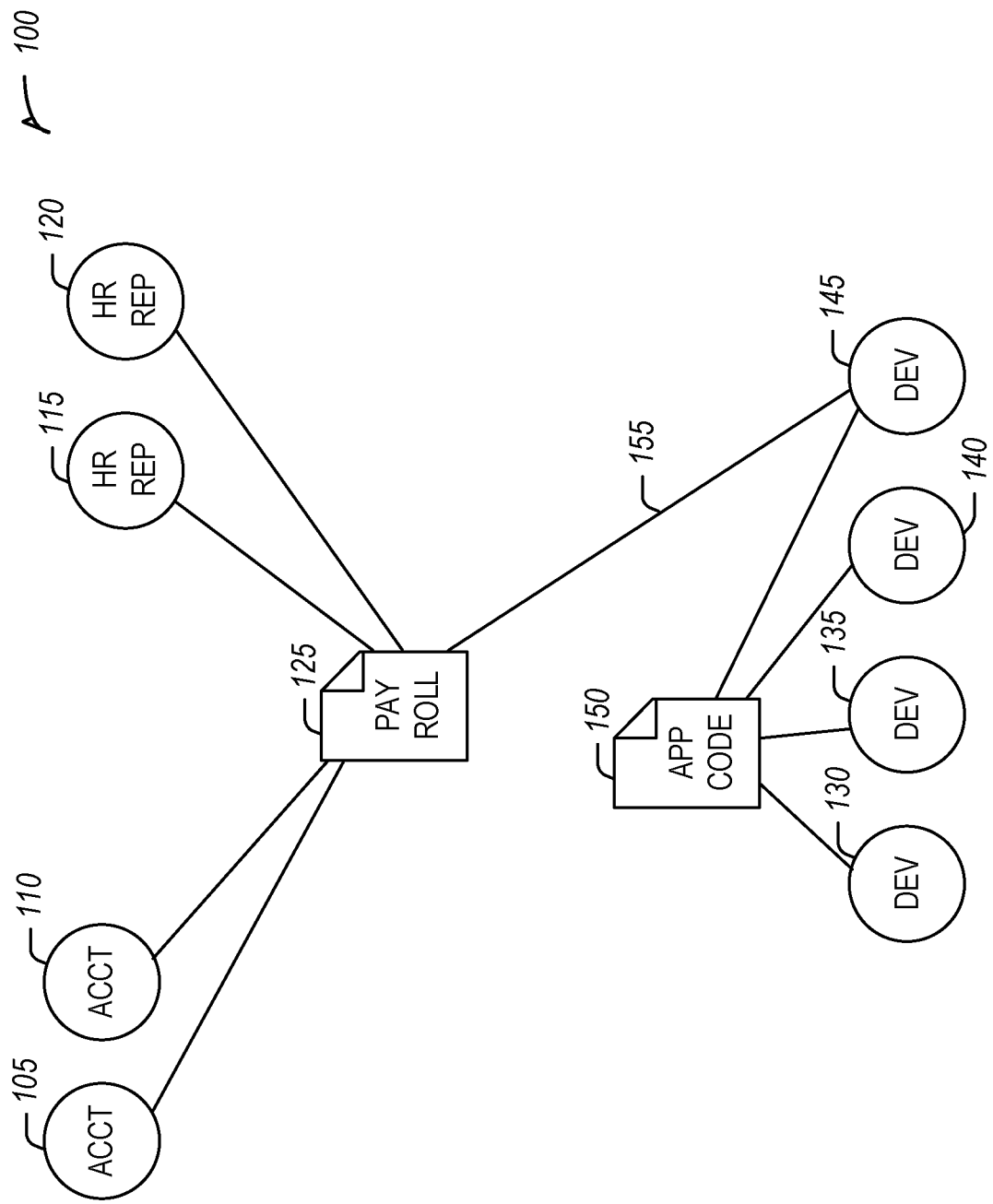
FIG. 1 illustrates an example graph of a user that has gained unauthorized access to a file, in accordance with some embodiments.

An organization may employ data control through a top-down policy based on which employees should be allowed access to which files. However, in large, complex, or collaborative organizations, a bottom up model may prove useful to determine who is likely to have authorized access to a file. Using data concerning which users currently and actually have access to a file may provide information to identify organic communities of users and provide information for generating alerts when a user gains access to a file they are unlikely to have authorized access.

Top-down approaches for data control may rely on setting access control parameter for all files and users. This presents general scalability issues as it becomes difficult to ensure every file and every user has the appropriate setting. Thus, an administrator may assign access rights based on groups or by position title. This may generalize the access provided and result in unintended users receiving access rights. Additionally, when exceptions are requested, problems may arise. For example, the access controls for a file may be adjusted to allow an outlier user (e.g.: a user that would not typically be granted access to such a file) to access the file, but in doing so, access is granted to all users in the outlier user's group. Similarly, an outlier user may have their permissions adjusted to access a restricted file, but in doing so the outlier user gains access to all files fitting that permission level. In an example, a software developer may be granted access to an employee record for a specific project, but inadvertently is granted access to all employee records.

Even when a top-down approach is implemented perfectly, there may still be ways for users to circumvent the data access control measures. A user may get the credentials of another user to retrieve restricted files. This is an example of an unauthorized user gaining access to a file through legitimate means. It is considered legitimate because from the perspective of the computing and access control system valid credentials were used. A user with access to restricted files may load the restricted files onto an external drive, such as a memory stick thumb drive, which may then be opened and viewed by a restricted user.

A bottom-up approach which uses data about the existing connections between users and data files to determine authorized and unauthorized access of data files may provide a solution which does not involve a significant amount of individual control for every user and file. Additionally, the solution may determine that an unauthorized access to a data file has occurred despite the access being legitimately attained. The bottom-up approach is an organic approach that uses the shared connections of users and files to determine authorized file access and may function with zero or little information about the user, the user's position, or information about the file or data object.

The techniques and methods describe a system to automatically determine unlikely file possession in a networked computer environment. A user's possession of a file may be considered unlikely if there is a low probability the user would have authorized access to the file under normal operating circumstances. In an embodiment, the techniques and methods described herein may begin by building a graph in which each node represents either a user or a file and each edge, or connection, represents the file is stored on the device associated with the user. The techniques and methods described herein may apply a statistical approach to estimate the probability that each link is authorized (e.g. the user is supposed to have access to the file). An alert to security analysts may be generated when a new link is determined to have a low-probability of being authorized.

The techniques and methods described herein for a system to determine unlikely file possession may construct a graph for a networked computing environment comprising nodes and edges. A file node may represent a file, data object, or a grouping of files or data objects. A user node may represent a computing device associated with a user. An edge between two nodes may only be between a user node and a file node. An edge, or connection, represents the file of the file node being present on the computing device of the user node.

The techniques and methods described herein relate to a system of networked computing devices and the data files which may be shared between these devices. A description of a user or person having access or a connection to a file refers to the computing device associated with the user or person having possession of the file, such as the computing device storing the file on the computing device's storage medium. The description herein may refer to a data file in the singular, however, the data file may represent multiple files or data objects, such as part of a project, portfolio, or data storage system. For example, in an embodiment, a user may have gained access to a classified development project, thus this refers to the user having access to all the restricted data objects which are part of the classified development project.

A graph may be constructed to represent a networked computing environment. The presence of a particular file on a computing device may be represented as a connection between a user node and a file node, where the user node represents a computing device associated with the user and the file node represents the particular file. The connection may be considered a link or a graph edge. The graph comprises two types of nodes, user nodes and file nodes. It is to be understood that the term user node or references to the user being in possession of a file refers to a computing device associated with the user storing the file. Connections may only exist between a computing device node (which has an associated user) and a file node. As new files and computing devices appear in the organization's network, new nodes and connections are added to the graph.

A connection path may be the path of connections that leads from a user node to a file node, if the direct connection between the user node and file node did not exist. Multiple connection paths may exist for any user node and file node pair. For example, if user Jim and user Bob each have a connection to File A, but only Bob has a connection to File B, then a connection path for Jim to File B would be from Jim to File A to Bob to File B.

FIG. 1 illustrates an example graph 100 of a user that has gained unauthorized access to a file, in accordance with some embodiments. The example graph 100 may be generated by scanning the computing devices associated with a set of users to identify the files stored on each device and determining which files are shared by multiple users. In the example graph 100, accountant 105, accountant 110, human resources (HR) representative 115, and HR representative 120 all have access to the pay roll file 125. From the non-technical perspective, this is appropriate as these are all positions which might access a company's pay roll information. As payroll information is highly sensitive, only those authorized should be able to access it. In the example graph 100, developer 130, developer 135, developer 140, and developer 145 have access to the application code file 150. While possibly not as sensitive as the pay roll file 125, the accountants 105, 110 and HR representatives 115, 120 do not have access to the application code file 150 as they do not work on developing software. However, developer 145 is able to access pay roll file 125 as represented by connection 155. Based on the other connections of developer 145, such as to application code file 150, the connections of neighboring users (developer 130, developer 135, and developer 140), and the other connections to pay roll file 125 (accountant 105, accountant 110, HR representative 115, and HR representative 120), the connection 155 indicating developer 145 has access to pay roll file 125 is an outlier and may indicate unauthorized access. Determining this type of access to a file may identify potential unauthorized access, whether the access was gained legitimately (e.g. using an authorized user's credentials) or illegitimately (e.g. hacking the computing system). The unlikely file possession system may be agnostic to how a user came into possession of a file, in addition to information about the file, such as the file contents or metadata, and information about the user, such as the user's name or title.

Figure 2:
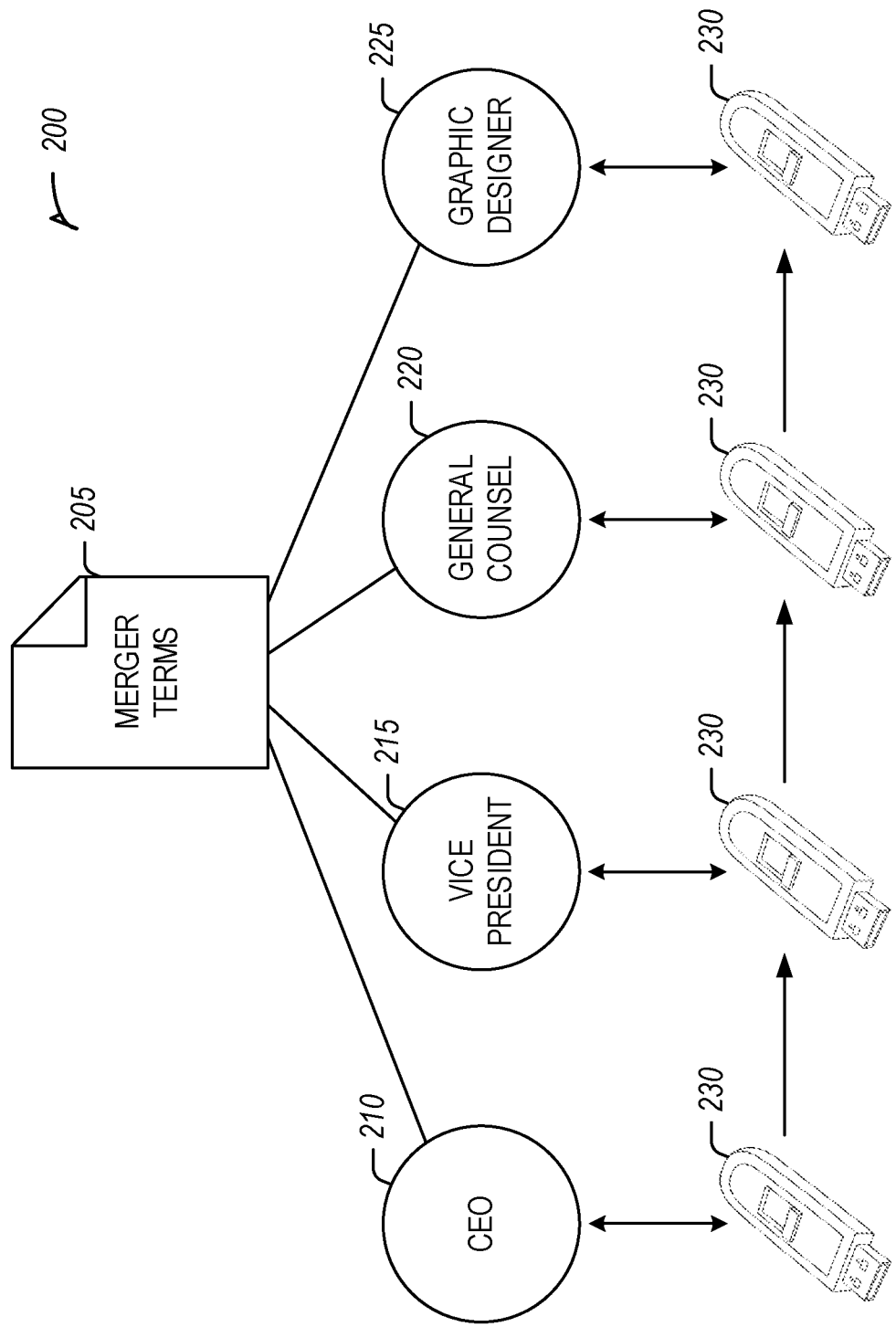
FIG. 2 illustrates a scenario of unlikely file possession, in accordance with some embodiments.

FIG. 2 illustrates a scenario 200 of unlikely file possession, in accordance with some embodiments. In scenario 200, an organization is planning a merger and has drawn up a set of merger terms 205. The information about the merger, and thus the merger terms 205 are only known by executives and counsel working on the merger. For example, the CEO 210, a vice president 215, and the general counsel 220 are part of the merger team. The merger terms 205 may be loaded onto a thumb drive 230.

The thumb drive 230 may be passed among those in the merger team, such as for reviewing the merger terms 205. When each team member receives the thumb drive 230, the member may plug the thumb drive 230 into their computer to access the merger terms 205. The unlikely file possession system may recognize the merger terms 205 on the computer and generate a connection from the user to the merger terms 205. For example, when the CEO 210 accesses the merger terms 205 on their computer, the unlikely file possession system may generate a connection from the CEO 210 to the merger terms 205. As the thumb drive 230 is passed to each member of the merger team, the member may access the merger terms 205 on their computing device and the unlikely file possession system may generate a connection from the respective user node to the merger terms 205 node.

As the thumb drive 230 is passed around, a member, such as general counsel 220, may accidentally get the thumb drive 230 mixed up or leave it in the copy room, and it ends up with graphic designer 225. Graphic designer 225 plugs the thumb drive 230 into their computer and accesses the merger terms 205, despite graphic designer 225 not being a part of the merger team and privy to the knowledge of a merger. The unlikely file possession system may recognize the graphic designer 225 has accessed the merger terms 205 and perform an analysis to determine if the access is legitimate. Using the metrics, the unlikely file possession system may determine that graphic designer 225 should not have access to merger terms 205. For example, using the neighbors with access metric may result in a value close to 0% as the neighbors for graphic designer 225 may be determined to be other graphic designers and people in the art department such as photographers, but may not include executives such as CEO 210 and vice president 215.

Scenario 200 may demonstrate the usefulness of the unlikely file possession system for determining unauthorized access to restricted or confidential files. Graphic designer 225 did not perform any improper acts to gain access to merger terms 205, such as hacking another computer system or using another user's credentials. Graphic designer 225 may have accessed the data on thumb drive 230, including the merger terms 205, without knowledge of what thumb drive 230 was for and what data it contained. Additionally, as graphic designer 225 did not do anything improper to access merger terms 230, there may not be any type of indication or alert that unauthorized access to a file had occurred. However, with the unlikely file possession system, this type of unauthorized access (e.g., absent any improper access actions) may be detected.

Figure 3:
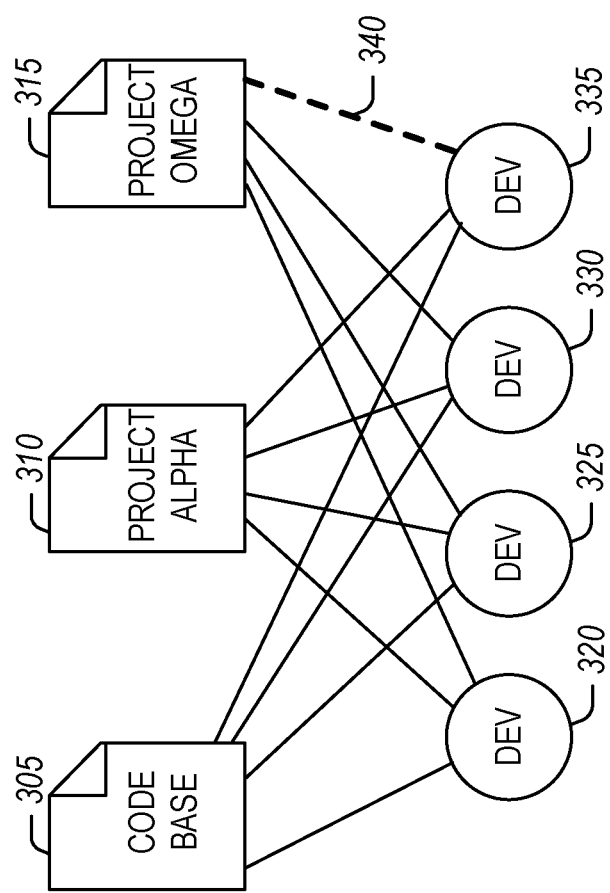
FIG. 3 illustrates an example of a determining authorized possession to a file, in accordance with some embodiments.

FIG. 3 illustrates an example 300 of a determining authorized possession to a file, in accordance with some embodiments. In the example 300, developer 320, developer 325, developer 330, and developer 335 have connections, or possession of the code base 305. In the example 300, developer 320, developer 325, developer 330, and developer 335 have connections, or possession of project alpha 310. However, only developer 320, developer 325, and developer 330 have connections, or possession of project omega 315. Should it be detected that developer 335 has gained possession of project omega 315, as indicated by new connection 340, the new connection may be evaluated. Based on the connection similarities that developer 335 has with developer 320, developer 325, and developer 330 for code base 305 and project alpha 310, it may be determined that developer 335 has permissible possession of project omega 315.

Figure 4:
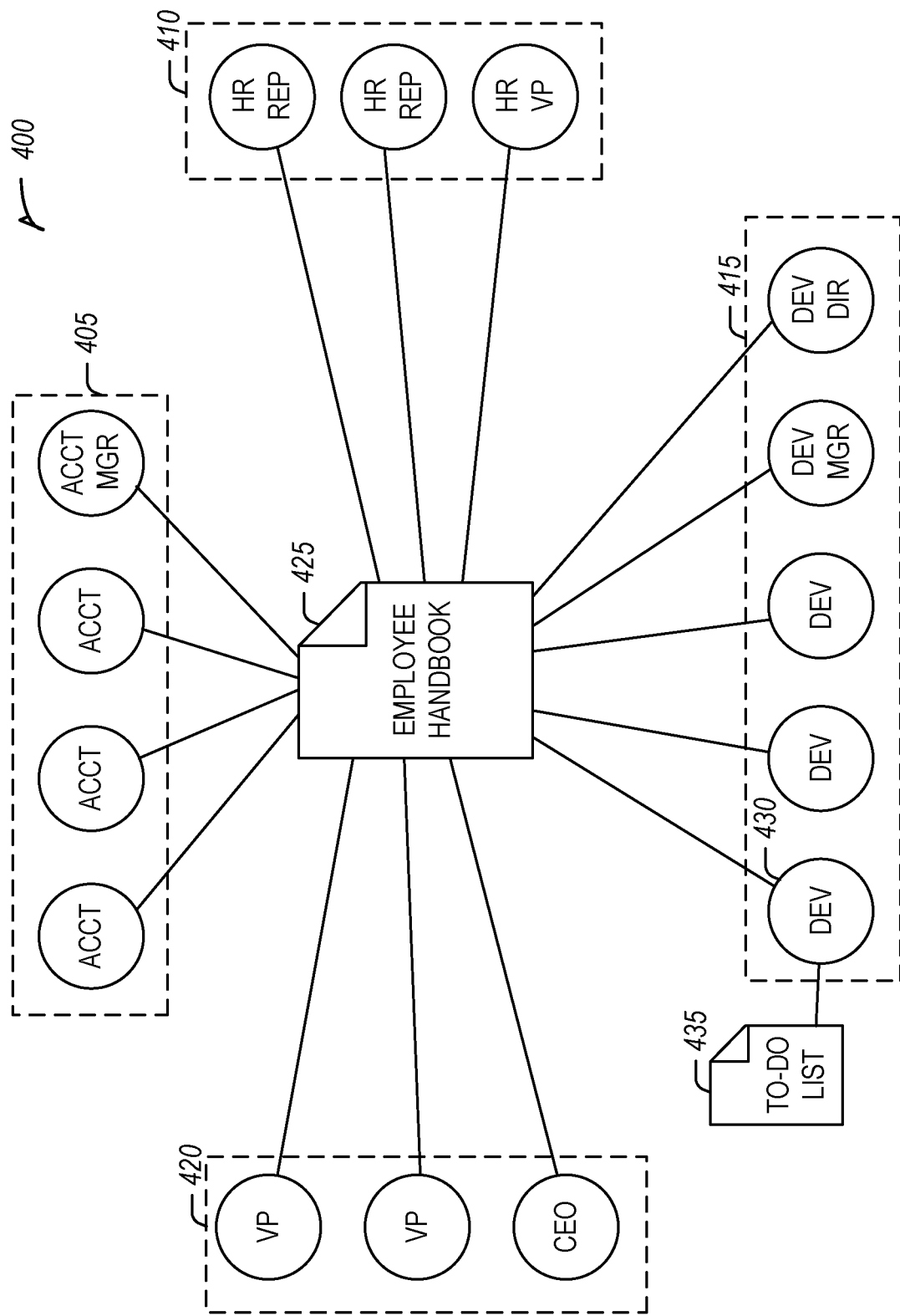
FIG. 4 illustrates an example of files that may not be tracked, in accordance with some embodiments.

FIG. 4 illustrates an example 400 of files that may not be tracked, in accordance with some embodiments. Example 400 illustrates multiple groups of users and their computing devices which are part of a networked computing environment. The illustrated groups include an accounting group 405, HR group 410, development group 415, and executive group 420. All of the users in the networked computing environment of example 400 have the employee handbook 425 located on their computing device. Based on all the users having access to the employee handbook 425, it would not be tracked for unlikely file possession or access. The unlikely file possession system may determine based on the connections, such as a large proportion of users having a connection, to the employee handbook 425, that no access restrictions may exist for the file, and thus no need exists to track when a connection to a new user appears. This type of determination prevents data objects such as a computing device's operational files from being tracked.

Example 400 includes a developer 430 which has a file on the associated computing device of their personal to-do list 435. The to-do list 435 file is only located on the computing device for developer 430. There are no other users in the networked computing environment with a connection to the to-do list 435 file. The unlikely file possession system may determine not to track the to-do list 435. It may be computationally cumbersome to track every individual file on each user's computing device.

The networked computing environment of an organization may have each computing device on the network scanned to detect the files located on each computing device. Each computing device in the networked computing environment may have a data forensics program installed, such as Code42's Forensic Search data program. A data forensics program may monitor and record the data interactions on the computing device, such as recording and reporting files which are stored on the computing device and reporting when a new file is stored on the computing device. The data forensics program may scan for changes on each computing device to report to the unlikely file possession system. The graph may first be populated with the user nodes for each computing device. The graph may then be populated with the file nodes for each data object. Data objects which are only located on a single computing device may not be included. Data objects which are located on a high percentage of computing devices may not be included. The threshold for a high percentage may be predetermined by a user. For example, to avoid risk of not tracking any potential sensitive data object, the threshold may be set at 100%. In another example, it may be determined that it is not necessary to track a data object which is possessed by a high number of users, as the data object may not be a sensitive item if so many users have access to it, and thus the threshold may be set at 75%.

Metrics for determining unlikely possession of a file by a user may be calculated based on the populated graph. The direct connection between the user node and file node may be ignored for the calculation of the metrics. All metrics are based on connections and connections paths should the direct connection between a user node and file node not exist. In some examples a combination of one or more metrics may be used. In some examples, a combination of one or more metrics may be used with weights applied to each of the metrics. A score may be calculated for a connection based upon the metrics, where the score calculation may be based on one metric or a combination of metrics.

Example metrics used to calculate a score may include a minimum degree of separation between the user node and the file node, an average degree of separation between the user node and the file node, a percentage of neighbor nodes with connections to the file node, a minimum number of cuts to isolate the user node from the file node, and the number of bridges on a connection path between the user node and file node.

The minimum degrees of separation metric between the user node and the file node and average degrees of separation metric between the user node and the file node both use the same data but are evaluated differently. The degrees of separation is the number of connections in a connection path (besides the direct connection between the user node and file node). Thus, the degrees are the number of connections which are traversed in the graph to go from a given user node to a given file node for a particular connection path. The minimum degrees of separation may evaluate the possible connection paths between the user node and the file node to determine the connection path with the least number of connections. The average degree of separation is the average number of connections for all the determined connection paths between the user node and the file node.

The percentage of neighbor nodes with connections to the file node metric is the number of user nodes that may be considered neighbors to the given user node which also have a direct connection to the given file node. Determination of neighbor node may be based on one or more factors. A neighbor to the given user node may be a user node which has the same position title as the given user node. For example, two user nodes may be considered neighbors because the user associated with each node has the title of Senior Software Engineer at the organization. A neighbor to the given user node may be a user node which has a minimum number of similar direct connections. For example, the minimum threshold may be set to three connections, thus Maureen and Tara may be considered neighbors because they each have a direct connection to nodes for File A, File B, and File C. A neighbor may be anyone that is within the same department as the user node. Neighbors may be identified using standard community detection methods and social network analysis methods.

The minimum number of cuts to isolate the user node from the file node metric indicates the number of cuts which would be necessary to completely break all connection paths from the user node to the file node. This may be found by taking all of the possible connection paths and determining the number of cuts that would be necessary in each connection path to isolate the user node from the file node. The number of cuts for the path with the lowest number of necessary cuts would be the minimum number of cuts to isolate the user. A low number for the minimum number of cuts to isolate may indicate unauthorized file possession. The low number of minimum number of cuts to isolate may be indicative of there being a low degree of commonality between the user node and the file node if it is easy (e.g. not many cuts are necessary) to separate and isolate the user node from the file node.

The number of bridges on a connection path between the user node and file node is the number of connections, that if cut, would break all connection paths between the user node and the file node. This may also be considered the number of connections that are shared by all connection paths between the user node and file node. Thus, for each connection path, if there is a connection which is always traversed for each connection path traversal, then that connection is considered a bridge. For each bridge, it may indicate that there are no alternative traversal routes around the connection. A higher number of bridges between a user node and file node may indicate unauthorized file possession, as a high number of bridges indicates there is a limited number of means for traversing connection paths between the user node and file node, and thus a low commonality between the nodes.

Score for a connection may be calculated using metrics, with the calculation configured by an administrator to apply more or less weight to different metrics based on personal preferences or proven results for the particular organization. For example, the administrator may find that a combination of the minimum degrees of separation and minimum number of cuts metrics have proven to yield the best results for determining actual unlikely file possession, and thus more weight is applied to those metrics for future determinations. A score may be a weighted summation where each metric is normalized and given a score then the total score for a connection is calculated and compared to a threshold. The weights and the threshold may be fixed or may be determined through the use of machine learning.

Machine learning may be used to determine a weighting scheme for the metrics. Results of unauthorized file possession determinations may be provided to a supervised learning classification algorithm including the metrics data for each determination. The results may include both confirmed instances of unauthorized file possession and false positives. Providing this data to the classification algorithm may allow for the classification algorithm to learn the metrics which are least likely to indicate a false positive. The classification algorithm may develop a weighting scheme for the metrics, such that the metrics which are most indicative of actual unauthorized file possession are given the most weight. The classification algorithm may be used to determine thresholds for each metric. Metrics such as the minimum degree of separation may vary based on the size of the organization. Thus, results of unauthorized file possession for each metric may be provided to classification algorithm to determine the degree of separation which is exceeded that yields at least less false positives than true positives for unauthorized file possession.

Figure 5A:
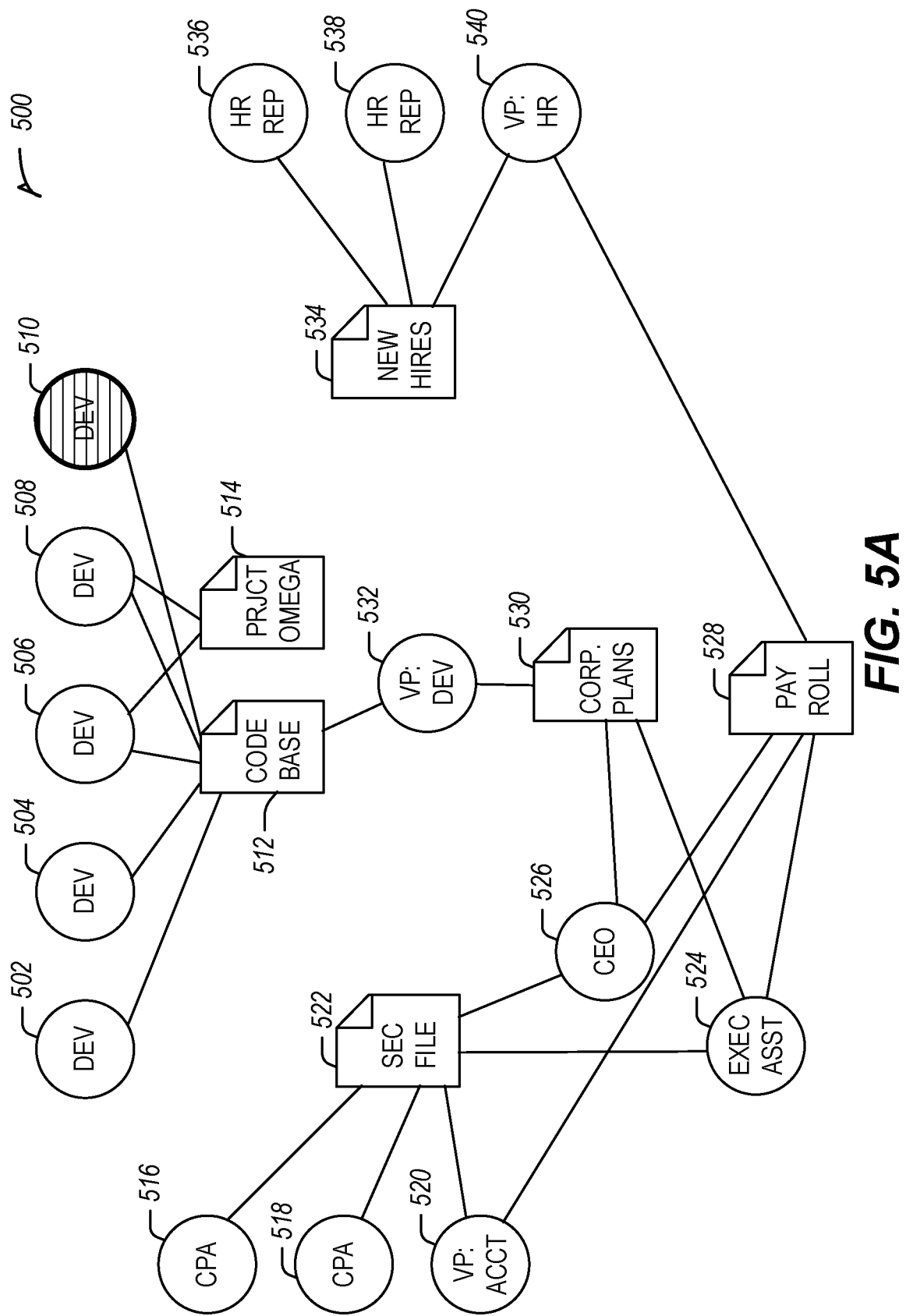
FIGS. 5A, 5B, and 5C illustrate an example graph for an organization, in accordance with some embodiments.

FIG. 5A illustrates an example graph 500 for an organization, in accordance with some embodiments. In the example graph 500 there are four groups of user nodes represented with related file nodes. In some embodiments, groups may be based on a set of users with similarities, such as having similar position titles or being part of the same department (e.g., human resources, accounting, legal), but need not be formally defined. The software development group includes developers 502, 504, 506, 508, and 510, development vice president 532, and file nodes for the code base 512 and project omega 514. The human resources group includes HR representative 536 and 538, HR vice president 540, and a file node for new hires 534. The accounting group includes certified public accountants (CPAs) 516 and 518, accounting vice president 520, and file node for Securities Exchange Commission (SEC) filings 522. The executive group includes the Chief Executive Officer (CEO) 526 and an executive assistant 524, with file nodes for corporation plans 530 and pay roll 528.

In example graph 500, developers 502, 504, 506, 508, and 510 each have a connection to the code base 512. Developers 502, 504, 506, and 508 each have a connection to project omega 514, but developer 510 does not.

Figure 5B:
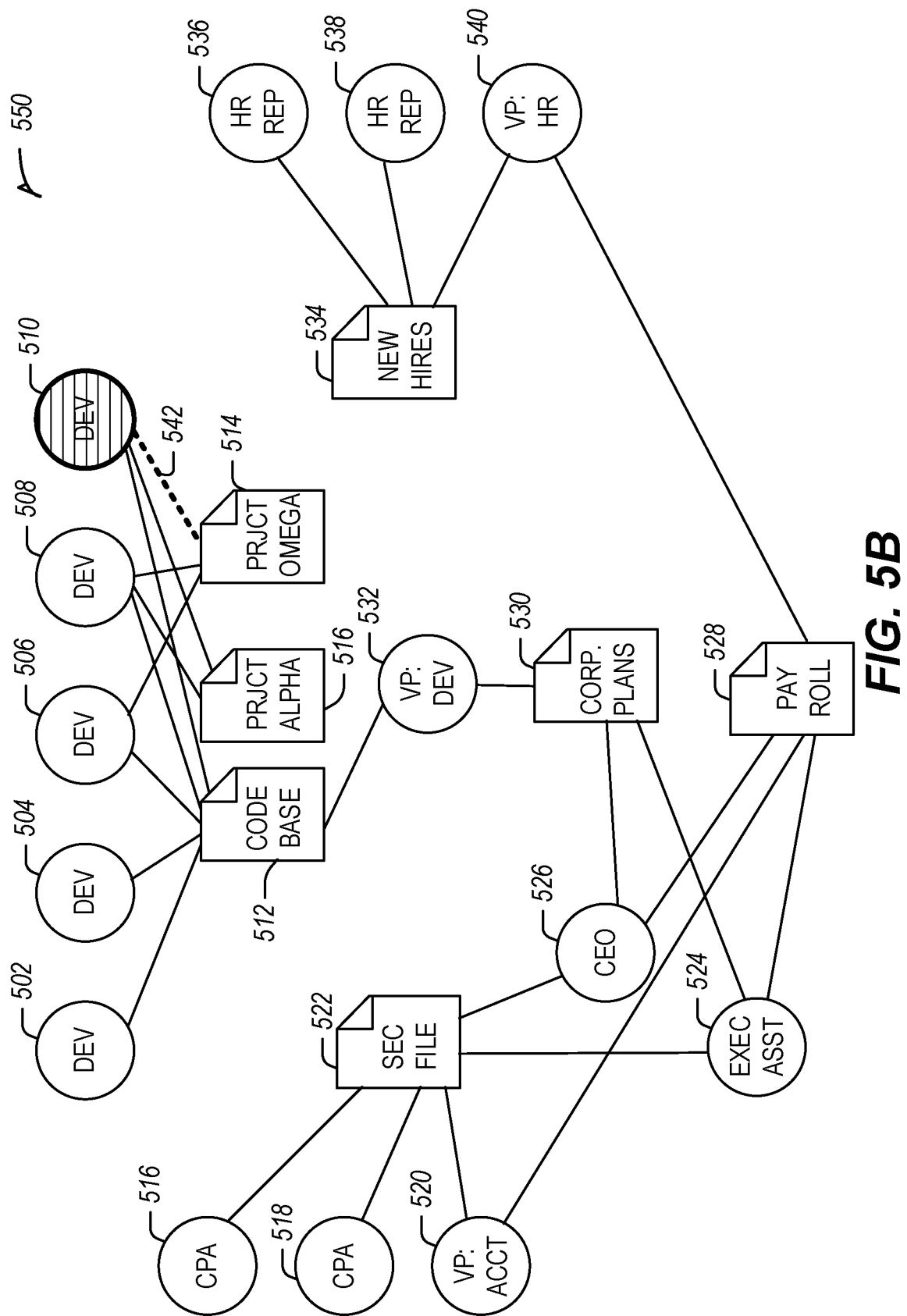

FIG. 5B illustrates an example graph 550 with a new connection, in accordance with some embodiments. In example graph 550, the unlikely file possession system has detected developer 510 has access or possession of the file or files for project omega 514 and thus a connection 542 is generated between developer 510 and project omega 514 in the example graph 550. The unlikely file possession system may use metrics to determine if developer 510 acquired the project omega 514 files legitimately.

If connection 542 did not exist, there are four connection paths between developer 510 and project omega 514. The first connection path is from developer 510 to code base 512 to developer 506 and finally to project omega 514. This path has a degree of three, as it takes three connections to traverse. The second connection path is from developer 510 to code base 512 to developer 508 and finally to project omega 514. This path has a degree of three, as it takes three connections to traverse. The third connection path is from developer 510 to project alpha 516 to developer 508 and finally to project omega 514. This path has a degree of three, as it takes three connections to traverse. The fourth connection path is from developer 510 to project alpha 516 to developer 508 to code base 512 to developer 506 and finally to project omega 514. This path has a degree of five, as it takes five connections to traverse. Thus, the minimum degrees of separation is three. The average degrees of separation is 3.5. For the size of example graph 550, three degrees of separation and 3.5 degrees of separation is relatively low, and thus both the average and minimum degrees of separation analysis may indicate developer 510 acquired project omega 514 legitimately.

Several factors may be used to determine a neighbor for a user node, such as position title, similar connections, physical location, and seniority. The unlikely file possession system and associated graph may determine likelihood of possession without any descriptive data and base the analysis on the graph alone. In an example where the titles of the nodes are unknown, but included here for identification, developer 510 has a connection, to code base 512. There are five other user nodes with a connection to code base 512, developers 502, 504, 506, and 508, and development vice president 532. These five user nodes may be considered neighbors to developer 510 as they share a similar connection. Of the five user nodes, developer 506 and 508 have a connection to project omega 514, or 40% have a similar connection. Thus, based on the graph alone, it may be determined that connection 542 is legitimate as 40% of neighbor nodes have the same legitimate connection.

By including descriptive data for the nodes, it may be determined that developer 510 has four neighbors in developers 502, 504, 506, and 508 as they share the same position title of "developer". Of developers 502, 504, 506, and 508, developers 506 and 508 have a connection to project omega 514. Thus 50% of the neighbors for developer 510 have access to project omega 514 and thus connection 542 may be determined to be legitimate based on a neighbor metric using shared position titles.

In example graph 550, the minimum number of cuts to isolate metric may be used to determine if connection 542 is legitimate. The number of cuts to isolate metric determines the number of cuts which would be necessary to completely break all connection paths from the user node to the file node. In the example graph 550, the minimum number of cuts to isolate developer 510 from project omega 514 is two. If the connection from developer 510 to code base 512 and the connection from developer 510 to project alpha 516 were severed, then no connection paths could exist from developer 510 to project omega 514. For the size and structure of the example graph 550, two cuts as the minimum number of cuts to isolate is relatively high, and thus indicating that connection 542 is legitimate.

In example graph 550, the number of bridges on a connection path may be used to determine if connection 542 is legitimate. The number of bridges on a connection path between the developer 510 and project omega 514 is the number of connections, that if cut, would break the all of the connection paths between the developer 510 and project omega 514. A bridge exists when there is a connection shared by all connection paths. If there are one or more connections which must be traversed by every connection path between a user node and a file node, then those may be considered bridges. In example graph 550, the number of bridges is zero as there are no connections that may be cut which would result in breaking all connection paths from developer 510 and project omega 514.

As previously discussed, a first connection path is from developer 510 to code base 512 to developer 506 and finally to project omega 514. The second connection path is from developer 510 to code base 512 to developer 508 and finally to project omega 514. The third connection path is from developer 510 to project alpha 516 to developer 508 and finally to project omega 514. The fourth connection path is from developer 510 to project alpha 516 to developer 508 to code base 512 to developer 506 and finally to project omega 514. If the connection from developer 510 to code base 512 was removed, then the third and fourth connection paths would still persist and if the connection from developer 510 to project alpha 516 was removed, then the first and second connection paths would still persist. Thus, there are no connections, or bridges, which may result in breaking all connection paths, and indicating connection 542 is legitimate.

Figure 5C:
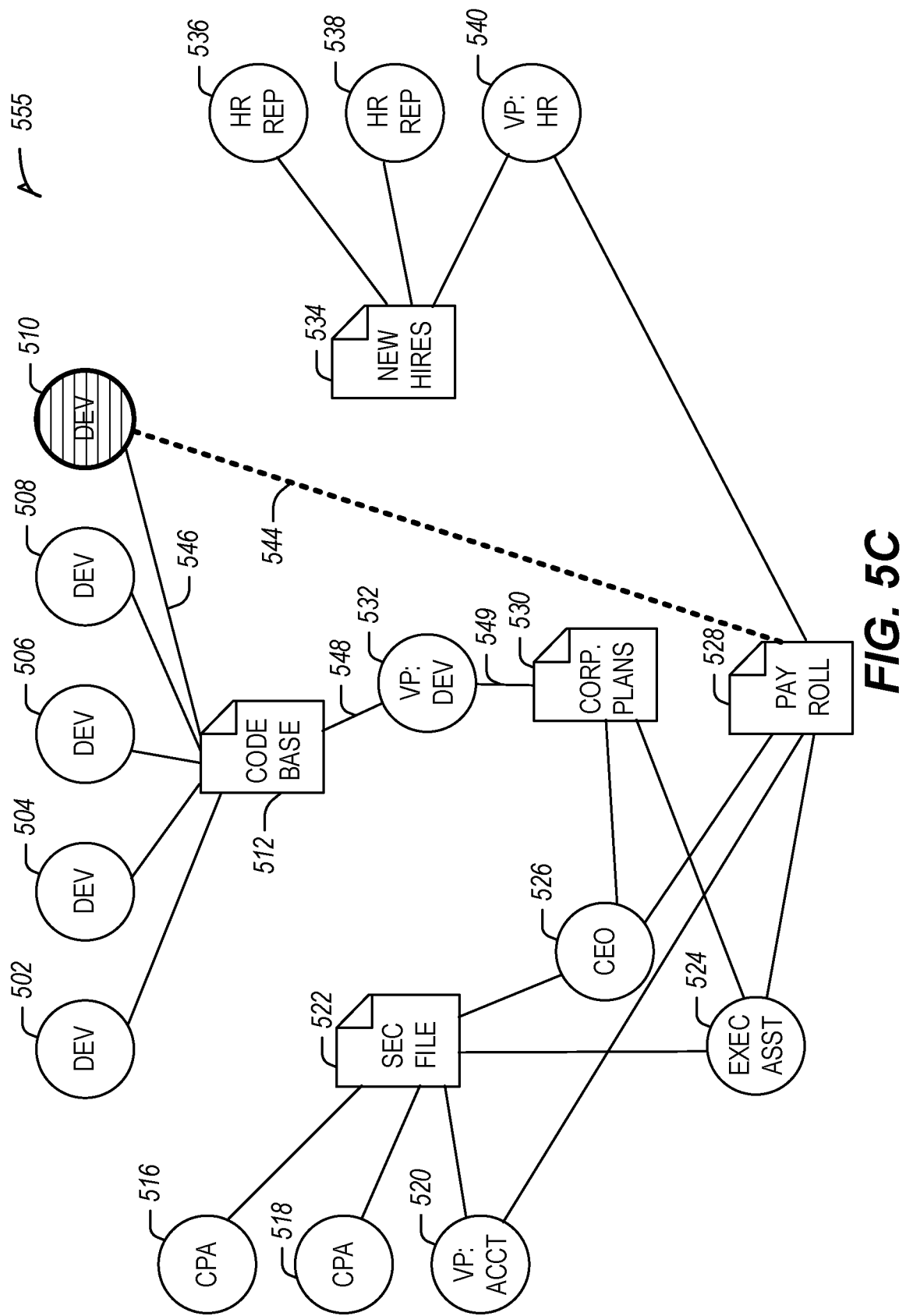

FIG. 5C illustrates an example graph 555 with a new connection, in accordance with some embodiments. In example graph 555, the unlikely file possession system has detected developer 510 has possession of the file or files for pay roll 528 and thus a connection 544 is generated between developer 510 and pay roll 528 in the example graph 555. The unlikely file possession system may use metrics to determine if developer 510 acquired the pay roll 528 files legitimately.

In example graph 555, the minimum and average degrees of separation metric may be used in determining if connection 544 is legitimate. The minimum degrees of separation for a connection path from developer 510 to pay roll 528 is five. An example of one of the five degree paths is from developer 510 to code base 512 to development vice president 532 to corporate plans 530 to CEO 526 and finally to pay roll 528. Other connection paths exist with a greater number of degrees, such as the seven degree connection path of developer 510 to code base 512 to development vice president 532 to corporate plans 530 to CEO 526 to SEC filings 522 to accounting vice president 520 and finally to pay roll 528. The average degree of separation for all the connection paths is 6.33. A minimum degree of separation of five and a relatively high average degree of separation of 6.33 may indicate that the connection 544 is not legitimate.

In example graph 555, a percentage of neighbor nodes with connections metric may be used to determine if connection 544 is legitimate. As previously discussed with FIG. 5B, multiple factors may be used to determine neighbors for a user node, including the structure of the graph alone. Without using any descriptive information, it may be determined that developers 502, 504, 506, and 508 with development vice president 532 are neighbors of developer 510 as the user nodes are each connected to code base 512 like developer 510. However, none of these neighbors are directly connected to pay roll 528. Thus, based on the structure of the graph alone, 0% of the neighbors for developer 510 are connected to pay roll 528 which may indicate connection 544 is not legitimate.

Neighbor nodes may be determined using descriptive information. For example, developers 502, 504, 506, and 508 may be considered neighbors of developer 510 as they all share the same position title of "developer". None of these neighbors, developers 502, 504, 506, and 508, of developer 510 have a connection to pay roll 528. Thus, based on using the position title to determine a neighbor, 0% of the neighbors for developer 510 are connected to pay roll 528 which may indicate connection 544 is not legitimate.

In example graph 555, the minimum number of cuts to isolate metric may be used to determine if connection 544 is legitimate. The number of cuts to isolate metric determines the number of cuts which would be necessary to completely break all connection paths from the user node to the file node. For the connection paths between developer 510 and pay roll 528, there are three connections, that if severed would break all connection paths. These connections are connection 546, connection 548, and connection 549. However, only one of these connections being severed (not all three) results in breaking all connection paths. Thus, while there are three possible connections that may be cut, the minimum number of cuts to isolate developer 510 from pay roll 528 remains one.

In example graph 555, the number of bridges on a connection path may be used to determine if connection 544 is legitimate. The number of bridges on a connection path between the developer 510 and pay roll 528 is the number of connections, that if cut, would break the all connection paths between the developer 510 and pay roll 528. For example, graph 555, there are three bridges: connection 546, connection 548, and connection 549. Each of these connections, if severed, would result in breaking all connection paths between developer 510 and pay roll 528. A relatively high number of bridges, such as three, is indicative of unlikely file possession.

The metrics determined for example graphs 550 and 555 are relative to the size of the graph and used for demonstrative purposes. Thus, a difference of one or two may not appear significant but are in comparison to the size of the example graphs 550 and 555. In use, a graph may comprise hundreds or thousands of nodes, resulting in metrics exponentially larger or with substantially broader ranges that may provide more distinguishable differences to a user. The size of the graph may result in different values for the metrics, such as the degrees of separation metrics being in the hundreds or the thousands. Based on the size of the graph, the metrics may be normalized (e.g., a number between 0 and 100) for evaluation. With the normalization, the metric value may be reversed, as some metrics indicate unlikely file possession with a low value and some metrics indicate unlikely file possession with a high value.

A score may be calculated based on one or more of the normalized metric values. In an embodiment, the score may be calculated by adding all the metric values together and determining if the score exceeds a threshold. A weight may be applied to one or more of the metric values based on prior analysis or machine learning to determine a metric may be more or less indicative of unlikely file possession. In an embodiment, an average may be determined for the selected group of metric values. Using an average of the metric values may provide for the addition and removal of metrics while the threshold stays constant.

In an example, a score may be determined using the metrics values for the number of bridges and the neighbor nodes from graph 555. Each of these scores is normalized to a number between 0 and 100, and thus using two metrics, the overall score cannot be more than 200. Additionally, because the neighbor node metric is based on a low value, it is reversed. Thus, the number of bridges was determined to be three. This value may be normalized to a value of 30. It may have also been determined that this value deserves more weight, and thus is weighted by doubling the value resulting in a weighted and normalized value of 60. The neighbor node value was determined to be 0%, thus the reverse is a value of 100. Adding the normalized, weighted, and accordingly reversed metric values results in a score of 160. The administrator, such as through statistics or machine learning, may have set a threshold score value of 142 to indicate unlikely file possession. Therefore, using the metrics of the number of bridges and neighbor nodes, the score of 160 exceeds the threshold of 142 and an alert may be generated to indicate an instance of unlikely file possession has been determined.

Figure 6:
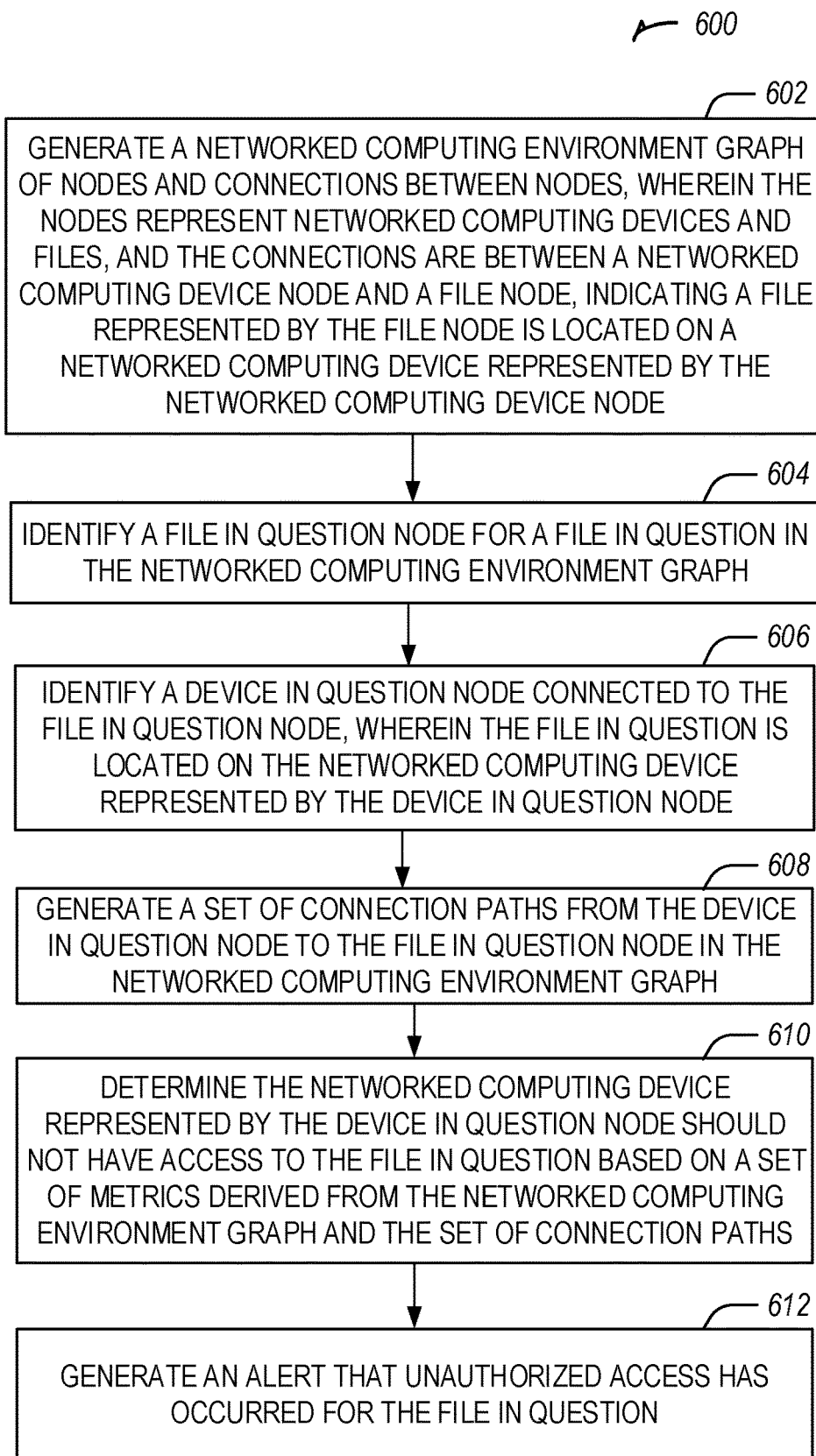
FIG. 6 illustrates a flowchart showing a technique for unlikely file possession detection, in accordance with some embodiments.

FIG. 6 illustrates a flowchart showing a technique 600 for unlikely file possession detection, in accordance with some embodiments. The technique 600 includes an operation 602 to generate a networked computing environment graph of nodes and connections between nodes. The nodes may represent networked computing devices and files, or data objects, residing on the networked computing devices. The connections may be between a networked computing device node and a file node, which indicates the file represented by the file node is located on the networked computing device represented by the networked computing device node. Each networked computing device may be associated with a user. Data related to a user may be stored, such as in a data base. Data related to a user may include a position title, a seniority level, a department, management identification, a location, and contact information.

The technique 600 includes an operation 604 to identify a file in question node for a file in question in the networked computing environment graph. The technique 600 includes an operation 606 to identify a device in question node connected to the file in question node. The file in question is located on the networked computing device represented by the device in question node.

The technique 600 includes an operation 608 to generate a set of connection paths from the device in question node to the file in question node in the networked computing environment graph. A connection path may be a path from the device in question node to the file in question node which traverses the connections through other file and device nodes, except the connection between the file in question node and the device in question node.

The technique 600 includes an operation 610 to determine the networked computing device represented by the device in question node should not have access to the file in question based on a set of metrics derived from the networked computing environment graph and the set of connection paths.

The technique 600 includes an operation 612 to generate an alert that unauthorized access has occurred for the file in question. The alert may identify the networked computing device represented by the device in question node. The alert may identify the user associated with the identified network computing device. The alert may include information about the user or the networked computing device such as the user's title, group, or department, the internet protocol (IP) address of the device, the supervisor of the user, the email address of the user, and the phone number of the user. The alert may provide the location of the device, such as from either an address or building schematic, or from a global positioning satellite (GPS) coordinate.

The technique 600 may further include a metric from the set of metrics based on determining a minimum number of cuts to isolate the device in question node from the file in question node exceeds a threshold. The minimum number of cuts to isolate is a total number of eliminated connections that may remove all connection paths between the device in question node and the file in question node.

The technique 600 may further include a metric from the set of metrics based on determining a minimum degree of separation exceeds a threshold. The minimum degree of separation is the number of connections in a connection path between the device in question node and the file in question node, with the lowest number of connections for all connection paths between the device in question node and the file in question node.

The technique 600 may further include a metric from the set of metrics based on determining the number of neighbors of the device in question node with a connection to the file in question node does not exceed a threshold. A neighbor may be another networked computing device node which has a predetermined number of connections to file nodes that are in common with the device in question node. A neighbor may be another networked computing device node with an associated user having a title that is the same as a title for a user associated with the device in question node.

The technique 600 may further include a metric from the set of metrics based on determining an average degree of separation exceeds a threshold. The average degree of separation may be the average of a number of connections in each connection path for all connection paths between the computing device and the file in question.

Figure 7:
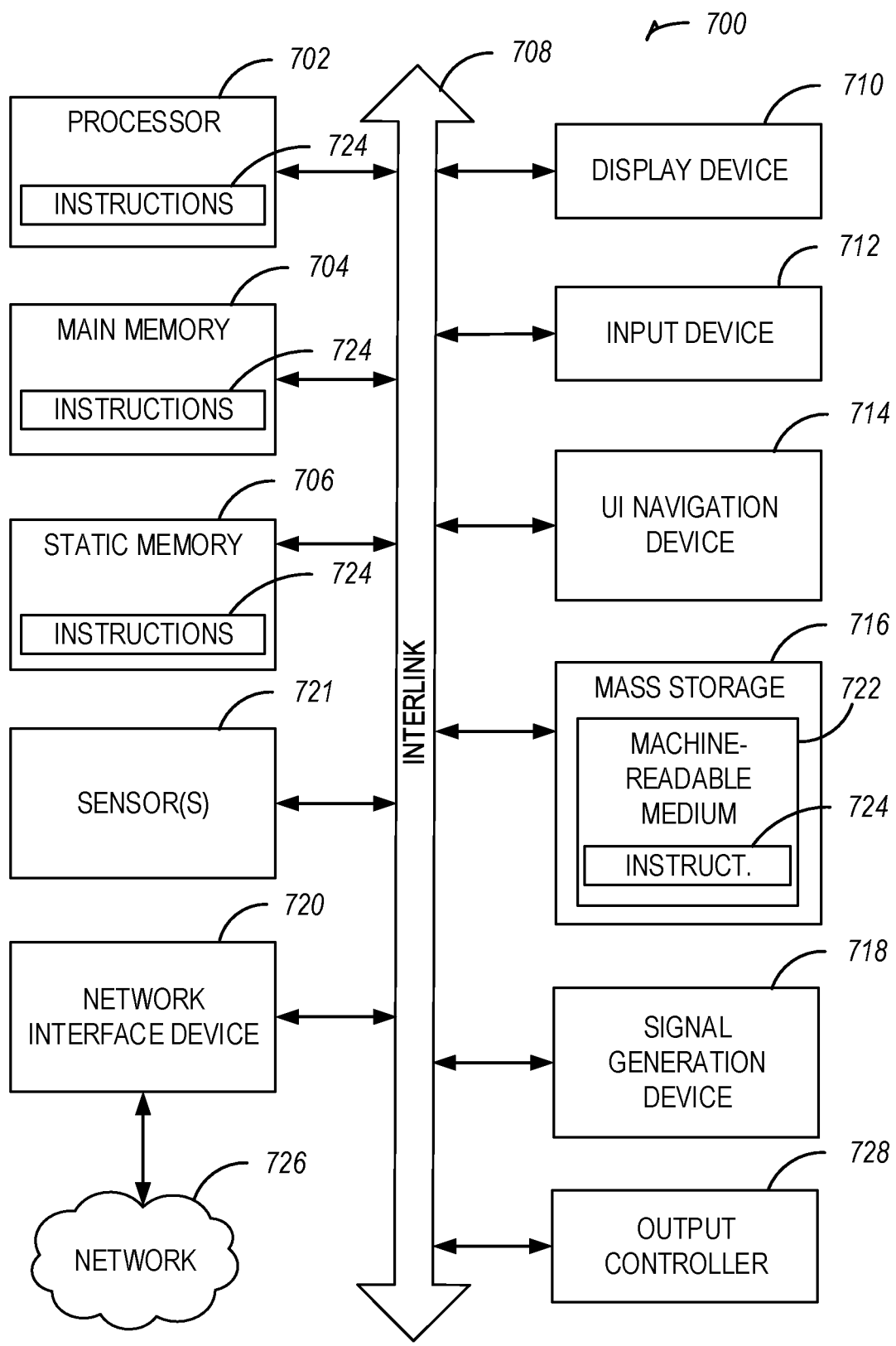
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Example 1 is a method for detecting unauthorized file possession, comprising: generating a networked computing environment graph, wherein nodes of the graph represent networked computing devices and files, and edges of the graph are between a networked computing device node and a file node, indicating a file represented by the file node is located on a networked computing device represented by the networked computing device node; identifying a file in question node for a file in question in the networked computing environment graph; identifying a device in question node connected to the file in question node, wherein the file in question is located on the networked computing device represented by the device in question node; generating a set of connection paths from the device in question node to the file in question node based upon edges of the networked computing environment graph; determining the networked computing device represented by the device in question node should not have possession of the file in question based on a set of metrics derived from the networked computing environment graph and the set of connection paths; generating an alert that unauthorized file possession has occurred for the file in question; and displaying the alert with indications of the device in question and the file in question on a graphical user interface.

In Example 2, the subject matter of Example 1 includes, wherein each networked computing device is associated with a user.

In Example 3, the subject matter of Examples 1-2 includes, wherein a metric from the set of metrics includes: determining a minimum number of cuts to isolate the device in question node from the file in question node exceeds a threshold, wherein the minimum number of cuts to isolate is a total number of eliminated edges that remove all connection paths between the device in question node and the file in question node.

In Example 4, the subject matter of Examples 1-3 includes, wherein a metric from the set of metrics includes: determining that a minimum degree of separation exceeds a threshold, wherein the minimum degree of separation is the number of edges in a connection path between the device in question node and the file in question node with the lowest number of edges for all connection paths between the device in question node and the file in question node.

In Example 5, the subject matter of Examples 1-4 includes, wherein a metric from the set of metrics includes: determining a number of neighbors of the device in question node with an edge to the file in question node does not exceed a threshold.

In Example 6, the subject matter of Example 5 includes, wherein a neighbor is a networked computing device node which has a predetermined number of edges to file nodes that are in common with the device in question node.

In Example 7, the subject matter of Examples 5-6 includes, wherein a neighbor is a networked computing device node with an associated user having a title that is the same as a title for a user associated with the device in question node.

In Example 8, the subject matter of Examples 1-7 includes, wherein a metric from the set of metrics includes: determining an average degree of separation exceeds a threshold, wherein the average degree of separation is the average of a number of edges in each connection path for all connection paths between the device in question node and the file in question node.

Example 9 is a system for detecting unauthorized file possession, comprising: at least one processor; and memory including instructions that, when executed by the at least one processor, cause the at least one processor to: generate a networked computing environment graph, wherein nodes of the graph represent networked computing devices and files, and edges of the graph are between a networked computing device node and a file node, indicating a file represented by the file node is located on a networked computing device represented by the networked computing device node; identify a file in question node for a file in question in the networked computing environment graph; identify a device in question node connected to the file in question node, wherein the file in question is located on the networked computing device represented by the device in question node; generate a set of connection paths from the device in question node to the file in question node based upon edges of the networked computing environment graph; determine the networked computing device represented by the device in question node should not have possession of the file in question based on a set of metrics derived from the networked computing environment graph and the set of connection paths; generate an alert that unauthorized file possession has occurred for the file in question; and display the alert with indications of the device in question and the file in question on a graphical user interface.

In Example 10, the subject matter of Example 9 includes, wherein each networked computing device is associated with a user.

In Example 11, the subject matter of Examples 9-10 includes, wherein a metric from the set of metrics comprises instructions to: determine a minimum number of cuts to isolate the device in question node from the file in question node exceeds a threshold, wherein the minimum number of cuts to isolate is a total number of eliminated edges that remove all connection paths between the device in question node and the file in question node.

In Example 12, the subject matter of Examples 9-11 includes, wherein a metric from the set of metrics comprises instructions to: determine that a minimum degree of separation exceeds a threshold, wherein the minimum degree of separation is the number of edges in a connection path between the device in question node and the file in question node with the lowest number of edges for all connection paths between the device in question node and the file in question node.

In Example 13, the subject matter of Examples 9-12 includes, wherein a metric from the set of metrics comprises instructions to: determine a number of neighbors of the device in question node with an edge to the file in question node does not exceed a threshold.

In Example 14, the subject matter of Examples 9-13 includes, wherein a metric from the set of metrics comprises instructions to: determine an average degree of separation exceeds a threshold, wherein the average degree of separation is the average of a number of edges in each connection path for all connection paths between the device in question node and the file in question node.

Example 15 is at least one computer readable medium including instructions for detecting unauthorized file possession that when executed by at least one processor, cause the at least one processor to: generate a networked computing environment graph, wherein nodes of the graph represent networked computing devices and files, and edges of the graph are between a networked computing device node and a file node, indicating a file represented by the file node is located on a networked computing device represented by the networked computing device node; identify a file in question node for a file in question in the networked computing environment graph; identify a device in question node connected to the file in question node, wherein the file in question is located on the networked computing device represented by the device in question node; generate a set of connection paths from the device in question node to the file in question node based upon edges of the networked computing environment graph; determine the networked computing device represented by the device in question node should not have possession of the file in question based on a set of metrics derived from the networked computing environment graph and the set of connection paths; generate an alert that unauthorized file possession has occurred for the file in question; and display the alert with indications of the device in question and the file in question on a graphical user interface.

In Example 16, the subject matter of Example 15 includes, wherein each networked computing device is associated with a user.

In Example 17, the subject matter of Examples 15-16 includes, wherein a metric from the set of metrics comprises instructions to: determine a minimum number of cuts to isolate the device in question node from the file in question node exceeds a threshold, wherein the minimum number of cuts to isolate is a total number of eliminated edges that remove all connection paths between the device in question node and the file in question node.

In Example 18, the subject matter of Examples 15-17 includes, wherein a metric from the set of metrics comprises instructions to: determine that a minimum degree of separation exceeds a threshold, wherein the minimum degree of separation is the number of edges in a connection path between the device in question node and the file in question node with the lowest number of edges for all connection paths between the device in question node and the file in question node.

In Example 19, the subject matter of Examples 15-18 includes, wherein a metric from the set of metrics comprises instructions to: determine a number of neighbors of the device in question node with an edge to the file in question node does not exceed a threshold.

In Example 20, the subject matter of Examples 15-19 includes, wherein a metric from the set of metrics comprises instructions to: determine an average degree of separation exceeds a threshold, wherein the average degree of separation is the average of a number of edges in each connection path for all connection paths between the device in question node and the file in question node.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for detecting unauthorized file possession, comprising:

generating a networked computing environment graph, wherein nodes of the networked computing environment graph represent networked computing devices and files, and edges of the networked computing environment graph are between a networked computing device node and a file node, indicating a file represented by the file node is located on a networked computing device represented by the networked computing device node;

identifying a file in question node for a file in question in the networked computing environment graph;

identifying a device in question node connected to the file in question node, wherein the file in question is located on the networked computing device represented by the device in question node;

generating a set of connection paths from the device in question node to the file in question node based upon edges of the networked computing environment graph;

determining the networked computing device represented by the device in question node should not have possession of the file in question based on a set of metrics derived from the networked computing environment graph and the set of connections paths, wherein the set of metrics includes a first metric determined based on a minimum number of cuts to isolate the device in question node from the file in question node exceeds a threshold, wherein the minimum number of cuts to isolate is a total number of eliminated edges that remove all connection paths between the device in question node and the file in question node;

generating an alert that unauthorized file possession has occurred for the file in question; and displaying the alert with indications of the device in question and the file in question on a graphical user interface.

2. The method of claim 1, wherein each networked computing device is associated with a user.

3. The method of claim 1, wherein a second metric from the set of metrics includes:

determining that a minimum degree of separation exceeds a threshold, wherein the minimum degree of separation is a number of edges in a connection path between the device in question node and the file in question node with lowest number of edges for all connection paths between the device in question node and the file in question node.

4. The method of claim 1, wherein a second metric from the set of metrics includes:

determining a number of neighbors of the device in question node with an edge to the file in question node does not exceed a threshold.

5. The method of claim 4, wherein a neighbor is a networked computing device node which has a predetermined number of edges to file nodes that are in common with the device in question node.

6. The method of claim 4, wherein a neighbor is a networked computing device node with an associated user having a title that is the same as a title for a user associated with the device in question node.

7. The method of claim 1, wherein a second metric from the set of metrics includes:

determining an average degree of separation exceeds a threshold, wherein average degree of separation is the average of a number of edges in each connection path for all connection paths between the device in question node and the file in question node.

8. A system for detecting unauthorized file possession, comprising:

at least one processor; and memory including instructions that, when executed by the at least one processor, cause the at least one processor to:

generate a networked computing environment graph, wherein nodes of the networked computing environment graph represent networked computing devices and files, and edges of the networked computing environment graph are between a networked computing device node and a file node, indicating a file represented by the file node is located on a networked computing device represented by the networked computing device node;

identify a file in question node for a file in question in the networked computing environment graph;

identify a device in question node connected to the file in question node, wherein the file in question is located on the networked computing device represented by the device in question node;

generate a set of connection paths from the device in question node to the file in question node based upon edges of the networked computing environment graph;

determine the networked computing device represented by the device in question node should not have possession of the file in question based on a set of metrics derived from the networked computing environment graph and the set of connections paths, wherein the set of metrics includes a first metric determined based on a minimum number of cuts to isolate the device in question node from the file in question node exceeds a threshold, wherein the minimum number of cuts to isolate is a total number of eliminated edges that remove all connection paths between the device in question node and the file in question node;

generate an alert that unauthorized file possession has occurred for the file in question; and display the alert with indications of the device in question and the file in question on a graphical user interface.

9. The system of claim 8, wherein each networked computing device is associated with a user.

10. The system of claim 8, wherein a second metric from the set of metrics comprises instructions to:

determine that a minimum degree of separation exceeds a threshold, wherein the minimum degree of separation is a number of edges in a connection path between the device in question node and the file in question node with lowest number of edges for all connection paths between the device in question node and the file in question node.

11. The system of claim 8, wherein a second metric from the set of metrics comprises instructions to:

determine a number of neighbors of the device in question node with an edge to the file in question node does not exceed a threshold.

12. The system of claim 8, wherein a second metric from the set of metrics comprises instructions to:

determine an average degree of separation exceeds a threshold, wherein average degree of separation is the average of a number of edges in each connection path for all connection paths between the device in question node and the file in question node.

13. At least one non-transitory computer readable medium including instructions for detecting unauthorized file possession that when executed by at least one processor, cause the at least one processor to:

generate a networked computing environment graph, wherein nodes of the networked computing environment graph represent networked computing devices and files, and edges of the networked computing environment graph are between a networked computing device node and a file node, indicating a file represented by the file node is located on a networked computing device represented by the networked computing device node;

identify a file in question node for a file in question in the networked computing environment graph;

identify a device in question node connected to the file in question node, wherein the file in question is located on the networked computing device represented by the device in question node;

generate a set of connection paths from the device in question node to the file in question node based upon edges of the networked computing environment graph;

determine the networked computing device represented by the device in question node should not have possession of the file in question based on a set of metrics derived from the networked computing environment graph and the set of connections paths, wherein the set of metrics includes a first metric determined based on a minimum number of cuts to isolate the device in question node from the file in question node exceeds a threshold, wherein the minimum number of cuts to isolate is a total number of eliminated edges that remove all connection paths between the device in question node and the file in question node;

generate an alert that unauthorized file possession has occurred for the file in question; and display the alert with indications of the device in question and the file in question on a graphical user interface.

14. The at least one non-transitory computer readable medium of claim 13, wherein each networked computing device is associated with a user.

15. The at least one non-transitory computer readable medium of claim 13, wherein a second metric from the set of metrics comprises instructions to:

determine that a minimum degree of separation exceeds a threshold, wherein the minimum degree of separation is a number of edges in a connection path between the device in question node and the file in question node with lowest number of edges for all connection paths between the device in question node and the file in question node.

16. The at least one non-transitory computer readable medium of claim 13, wherein a second metric from the set of metrics comprises instructions to:

determine a number of neighbors of the device in question node with an edge to the file in question node does not exceed a threshold.

17. The at least one non-transitory computer readable medium of claim 13, wherein a second metric from the set of metrics comprises instructions to:

determine an average degree of separation exceeds a threshold, wherein average degree of separation is the average of a number of edges in each connection path for all connection paths between the device in question node and the file in question node.

* * * * *

UNITED STATES PATENT AND TRADEMARK OFFICE
CERTIFICATE OF CORRECTION

| | | |
|---|---|---|
| PATENT NO. | : 10,824,749 B2 | Page 1 of 1 |
| APPLICATION NO. | : 16/147086 | |
| DATED | : November 3, 2020 | |
| INVENTOR(S) | : Matthew Mills Parker | |

It is certified that error appears in the above-identified patent and that said Letters Patent is hereby corrected as shown below:

In the Claims

Column 19, Line 8, Claim 1, delete "connections" and insert --connection-- therefor Column 20, Line 14, Claim 8, delete "connections" and insert --connection-- therefor Column 21, Line 8, Claim 13, delete "connections" and insert --connection-- therefor Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*